US010975877B2

(12) United States Patent
Manzari et al.

(10) Patent No.: US 10,975,877 B2
(45) Date of Patent: Apr. 13, 2021

(54) COMBINED BEARING AND TURBOMACHINE INCLUDING SAID BEARING

(71) Applicant: Nuovo Pignone Tecnologie Srl, Florence (IT)

(72) Inventors: Vito Manzari, Florence (IT); Donato Antonio Ripa, Florence (IT); Fabrizio Milone, Florence (IT)

(73) Assignee: NUOVO PIGNONE SRL, Florence (IT)

( * ) Notice: Subject to any disclaimer, the term of this patent is extended or adjusted under 35 U.S.C. 154(b) by 620 days.

(21) Appl. No.: 15/579,650

(22) PCT Filed: May 27, 2016

(86) PCT No.: PCT/EP2016/062074
§ 371 (c)(1),
(2) Date: Dec. 5, 2017

(87) PCT Pub. No.: WO2016/193173
PCT Pub. Date: Dec. 8, 2016

(65) Prior Publication Data
US 2018/0172015 A1 Jun. 21, 2018

(30) Foreign Application Priority Data

Jun. 5, 2015 (IT) .................. 102015000020646

(51) Int. Cl.
*F04D 29/04* (2006.01)
*F04D 29/047* (2006.01)
(Continued)

(52) U.S. Cl.
CPC ....... *F04D 29/0473* (2013.01); *F01D 25/168* (2013.01); *F04D 13/06* (2013.01);
(Continued)

(58) Field of Classification Search
CPC ........ F04D 1/06; F04D 13/06; F04D 29/0413; F04D 29/0473; F04D 29/586;
(Continued)

(56) References Cited

U.S. PATENT DOCUMENTS 2,687,096 A * 8/1954 Armacost ............. F04D 29/128
415/175
2,796,027 A * 6/1957 Brown .................... F16C 33/74
415/112

(Continued)

FOREIGN PATENT DOCUMENTS

| EP | 2 136 073 A1 | 12/2009 |
| EP | 2 873 880 A1 | 5/2015 |
| WO | 00/28190 A1 | 5/2000 |

OTHER PUBLICATIONS

Italian Search Report and Written Opinion issued in connection with corresponding IT Application No. 102015000020646 dated Feb. 22, 2016.

(Continued)

*Primary Examiner* — Eldon T Brockman
(74) *Attorney, Agent, or Firm* — Baker Hughes Patent Organization (57) ABSTRACT

A combined bearing for a turbomachine is disclosed. The combined bearing comprises in combination: a radial bearing member, a thrust bearing member and a bearing-fluid impeller of a bearing-fluid boosting pump in fluid communication with the thrust bearing member and the radial bearing member.

16 Claims, 11 Drawing Sheets

(51) Int. Cl.
*F01D 25/16* (2006.01)
*F04D 13/06* (2006.01)
*F04D 29/041* (2006.01)
*F16C 17/26* (2006.01)
*F16C 33/10* (2006.01)
*F04D 1/06* (2006.01)
*F04D 29/58* (2006.01)

(52) U.S. Cl.
CPC .......... *F04D 29/0413* (2013.01); *F16C 17/26* (2013.01); *F16C 33/1045* (2013.01); *F04D 1/06* (2013.01); *F04D 29/586* (2013.01); *F05D 2240/52* (2013.01); *F05D 2240/53* (2013.01); *F05D 2240/54* (2013.01); *F16C 2360/00* (2013.01)

(58) Field of Classification Search
CPC .... F01D 25/168; F16C 17/26; F16C 33/1045; F16C 2360/00; F05D 2240/52; F05D 2240/53; F05D 2240/54

See application file for complete search history.

(56) References Cited

U.S. PATENT DOCUMENTS

| | | | | |
|---|---|---|---|---|
| 5,256,038 | A * | 10/1993 | Fairman | F04D 29/108 417/423.11 |
| 6,017,184 | A * | 1/2000 | Aguilar | F04D 29/26 415/112 |
| 7,997,802 | B2 * | 8/2011 | Simon | F16C 17/22 384/130 |
| 8,393,876 | B2 | 3/2013 | Sloteman et al. | |
| 8,485,798 | B2 | 7/2013 | Sheth et al. | |
| 8,534,989 | B2 * | 9/2013 | Groves | F01D 25/166 415/111 |
| 9,670,935 | B2 * | 6/2017 | Gerber | F04D 29/08 |
| 2002/0141862 | A1 * | 10/2002 | McEwen | F02C 6/12 415/111 |
| 2009/0311089 | A1 * | 12/2009 | Begin | F16C 32/064 415/104 |

OTHER PUBLICATIONS

International Search Report and Written Opinion issued in connection with corresponding PCT Application No. PCT/EP2016/062074 dated Sep. 9, 2016.
International Preliminary Report on Patentability issued in connection with corresponding PCT Application No. PCT/EP2016/062074 dated Dec. 5, 2017.

* cited by examiner

COMBINED BEARING AND TURBOMACHINE INCLUDING SAID BEARING

FIELD OF THE INVENTION

The disclosure in general relates to turbomachines and bearings for use in supporting the rotary shaft of turbomachines.

BACKGROUND ART

Turbomachines, such as in particular centrifugal pumps, are provided with radial and axial bearings. In some configurations, fluid bearings are used. Fluid bearings are such bearings, wherein the load is entirely supported by a thin film of a bearing fluid, either liquid or gaseous, between stationary pads and rotary pads or journals. In some known arrangements, the fluid processed by the turbomachine is unsuitable as bearing fluid, e.g. due to particulate contained therein. A dedicated bearing fluid is then needed, which is forcedly circulated in a closed loop and which is fed to the bearings. Water glycol or lubricating oil is used to feed the bearings for generating the bearing fluid film and for cooling purposes. In some configurations, mechanical seals or other systems are provided in the turbomachine areas, where process fluid is present. They prevent the process fluid from contacting the bearings and leak towards the external environment.

A bearing-fluid boosting system is required to circulate the bearing fluid through the bearings, the mechanical seals and a cooling system, where heat is removed from the bearing fluid.

This results in a complex structure, which negatively affects the reliability of the turbomachine.

A need therefore exists for a simpler structure of these mechanical components.

SUMMARY OF THE INVENTION

Aspects of the disclosure refer to a combined bearing configured for rotatingly supporting a shaft of a turbomachine and comprising in combination: at least one radial bearing member, at least one thrust bearing member or axial bearing member and a bearing-fluid impeller of a bearing-fluid boosting pump in fluid communication with the thrust bearing member and the radial bearing member.

The disclosure further concerns a turbomachine comprising: a casing; a shaft supported for rotation in the casing; and at least one turbomachine impeller mounted on the shaft for co-rotation therewith. According to embodiments disclosed herein, the turbomachine includes a combined bearing arranged and configured to support the shaft in a manner that the shaft can rotate in the casing. The combined bearing integrates at least one radial bearing member, at least one thrust bearing member and a bearing-fluid impeller of a bearing-fluid boosting pump in fluid communication with the thrust bearing member and the radial bearing member.

The combined bearing thus provides three different and combined functions: a thrust bearing function, a radial bearing function and a bearing-fluid pumping function.

The turbomachine can be a single-stage turbomachine with a single turbomachine impeller. The turbomachine impeller can be mounted in an overhanging manner. In other embodiments, the turbomachine can be a multi-stage turbomachine, for instance a between-bearing mounted turbomachine, including a plurality of turbomachine impellers mounted on the shaft between two end bearing arrangements.

In embodiments disclosed herein, the turbomachine can be a centrifugal pump, for instance a single-stage, or a multi-stage centrifugal pump.

In some embodiments the turbomachine can be configured for operation with the rotation axis of the shaft in a vertical position, or else in a horizontal position. In some applications the turbomachine can be for instance a subsea turbomachine, such as a subsea centrifugal pump, in particular a multistage centrifugal pump configured for operating with a vertical axis. The subsea turbomachine can be provided with a driver, e.g. an electric motor, which can be arranged at the bottom or on top of the turbomachine or underneath the turbomachine.

The casing of the turbomachine can be comprised of an outer barrel. An inner stationary turbomachine casing can be arranged in the outer barrel and surrounded thereby. In other embodiments, the turbomachine can be provided with only an outer casing.

According to another aspect, disclosed herein is a method of operating a turbomachine, comprising a casing, a shaft supported for rotation in the casing and at least one turbomachine impeller mounted on the shaft for co-rotation therewith; the method comprising the following steps: rotating the shaft against a combined bearing, the combined bearing providing axial and radial support to the shaft, wherein the combined bearing comprises at least one radial bearing member at least one thrust bearing member and a bearing-fluid impeller of a bearing-fluid boosting pump in communication with the thrust bearing member and the radial bearing member; and delivering pressurized bearing fluid with said bearing-fluid impeller to the thrust bearing member and the radial bearing member.

The method can further comprise the steps of: connecting a mechanical seal, arranged between the combined bearing and the turbomachine impeller, to the bearing-fluid boosting pump; and flushing the mechanical seal with bearing fluid pumped by the bearing-fluid boosting pump.

According to further embodiments, the method can further comprise the step of rotating the shaft against a further radial bearing; and pumping bearing fluid by means of the bearing-fluid boosting pump to the additional radial bearing. In some embodiments, a further mechanical seal can be provided between the impeller of the turbomachine and the additional radial bearing. The further mechanical seal can be flushed with bearing fluid pumped by the bearing-fluid boosting pump.

The bearing fluid can be circulated by the bearing-fluid boosting pump through a heat exchanger for cooling the bearing fluid thus removing heat from the bearings.

Other features and advantages of the invention will be better appreciated from the following detailed description of exemplary embodiments.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION

The devices described herein facilitate assembling, maintenance and refurbishing of rotary turbomachines, such as in particular, but not limited to single-stage or multi-stage centrifugal pumps.

In contrast to conventional bearing assemblies, an integrated, i.e. combined bearing is provided, which combines both radial as well as axial supporting functions for the rotating shaft of the turbomachine. Also an impeller for boosting the pressure of a bearing fluid can be integrated in the combined bearing. As the radial bearing and axial or thrust bearing are integrated in one and the same component, together with a bearing-fluid impeller, manufacturing and mounting these components in the turbomachine are made simpler. Also replacement of the bearing assembly is faster and requires less technical skill. The bearing fluid circuit is further simplified and made easier to manufacture and install.

As will be disclosed in more detail herein after, referring specifically to FIG. 3, an important aspect of the present disclosure is a combined bearing designed and configured for providing radial and axial bearing capability for the turbomachine shaft. For a better understanding of the function of such combined bearing, referring to FIGS. 1 and 2, the main features of the multistage centrifugal pump 1 will first be described.

Figure 1:
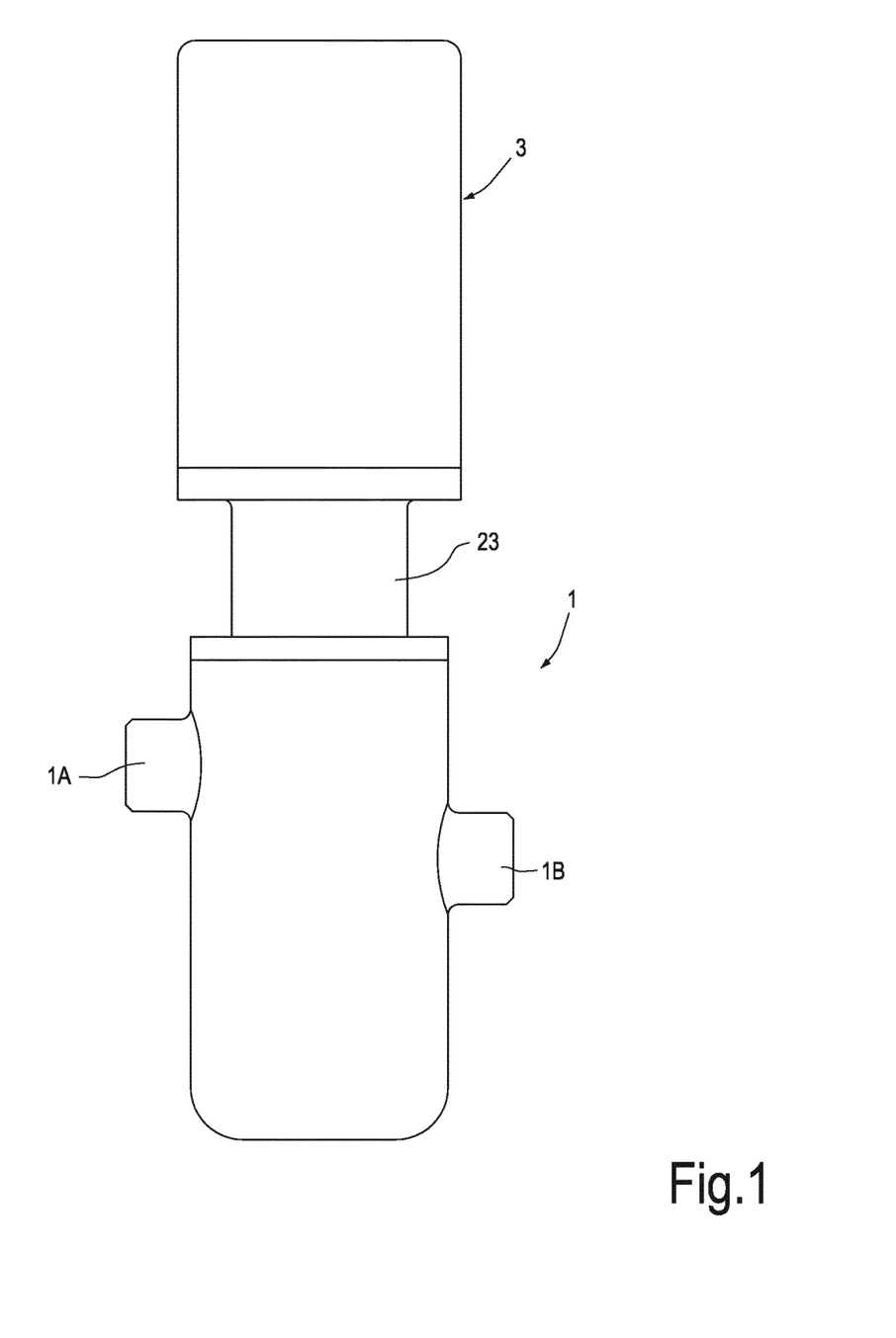
FIG. 1 illustrates a schematic of a turbomachine including a multistage centrifugal pump and an electric motor driving the pump.

In FIG. 1 a multistage centrifugal pump 1, driven by a driver, including e.g. an electric motor 3, is shown. A mechanical coupling 5 (FIG. 2) mechanically connects a driving shaft 7 of electric motor 3 to a shaft 11 of the multistage pump, which will be referred herein below as "pump shaft" 11 of the multistage centrifugal pump 1. In the exemplary embodiments disclosed herein the multistage centrifugal pump 1 can be a subsea multistage centrifugal pump, configured and designed for operating in a vertical position, i.e. with the rotation axis A-A oriented substantially vertically. In other embodiments, the multistage centrifugal pump can be a horizontal-axis multistage centrifugal pump. In some embodiments, the multi-stage centrifugal pump can be intended for uses different than subsea applications.

Figure 2:
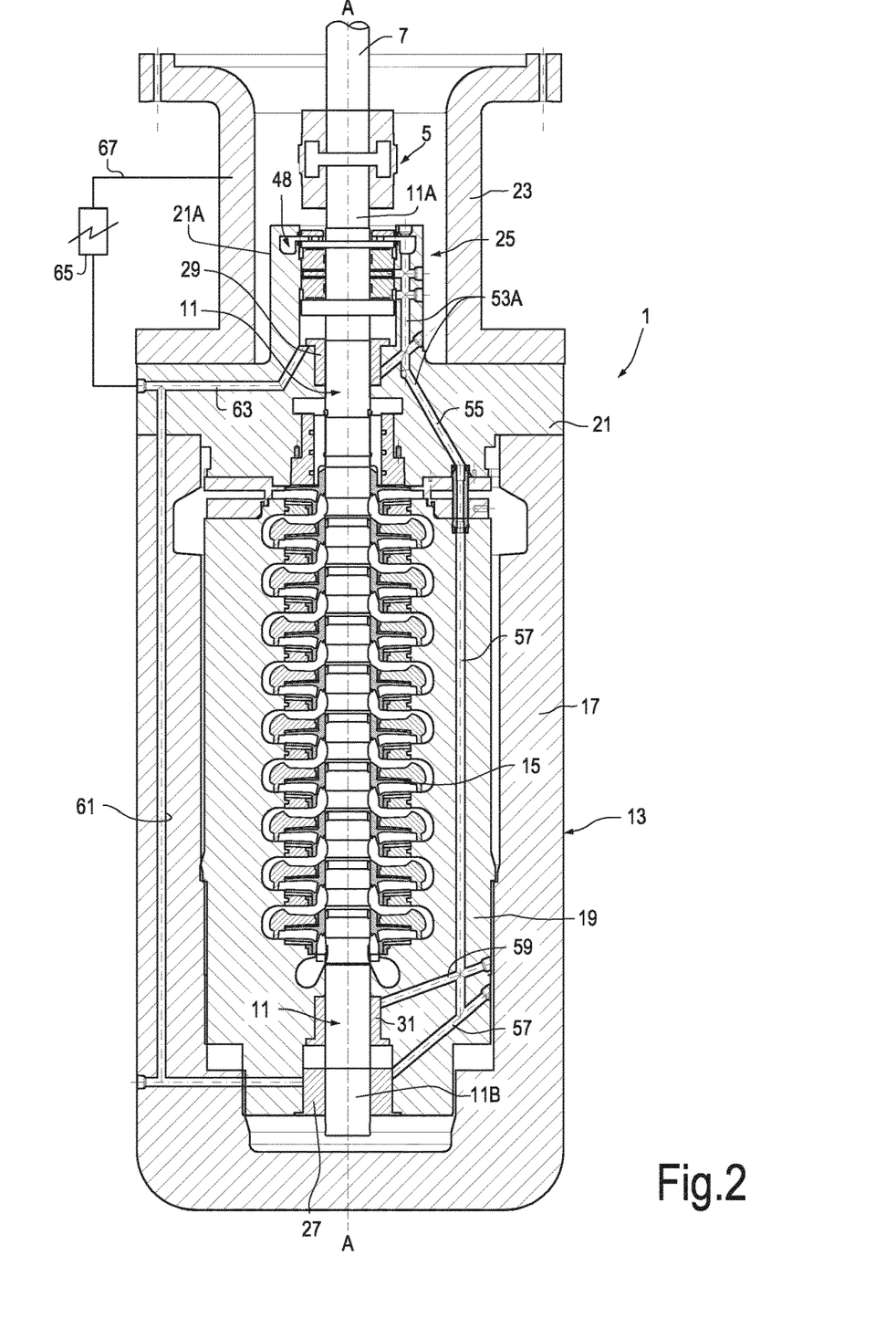
FIG. 2 illustrates a sectional view, along a plane containing the rotation axis, of a first embodiment of a multistage centrifugal pump according to the disclosure.

The multistage centrifugal pump 1 can comprise a statoric component that supports pump shaft 11 in a manner that pump shaft 11 can rotate around its longitudinal axis. A plurality of pump impellers 15 are mounted on pump shaft 11 for co-rotation therewith. In some embodiments, the statoric component can be comprised of a barrel 17, wherein a stationary inner pump casing 19 can be housed. Rotoric parts and statoric parts define a plurality of stages, which are serially arranged from a pump inlet to a pump outlet. A cover 21 closes the barrel 17 at the upper, drive end side thereof. An intermediate casing element 23 can be provided to connect the barrel 17 and cover 21 to a casing of the electric motor 3. The mechanical coupling 5 can be arranged inside the intermediate casing element 23. The barrel 17 and the inner pump casing 19 cumulatively form the pump casing 13.

The pump shaft 11 has a first end 11A and a second end 11B. The first end 11A is commonly named "drive end" of the pump shaft 11, as it is the end oriented towards the driver 3. The second end 11B is commonly named "non-drive end" of the pump shaft 11.

The pump shaft 11 is usually supported by bearings at or near both the drive end 11A and the non-drive end 11B thereof. Fluid bearings are used for rotatingly supporting the pump shaft 11. In embodiments disclosed herein, a combined bearing 25 is arranged at the drive end 11A of pump shaft 11 and a simple bearing, e.g. a simple radial bearing 27 is arranged at the non-drive end 11B of pump shaft 11. In the embodiment of FIG. 2, in order to separate the combined bearing 25 from the process fluid, which is processed through the pump stages, a first drive-end mechanical seal 29 can be provided. A second, non-drive-end mechanical seal 31 can be provided to separate the radial bearing 27 from the pump stages, where the process fluid is processed. The mechanical seals prevent leakages of process fluid towards the bearings, as the process fluid can contain solid particles, such as sand and the like, which may damage the bearings.

The combined bearing 25 and the radial bearing 27 are fed with a pressurized bearing fluid, which has the dual function of cooling the bearings by removing heat therefrom, and generating a fluid film between stationary pads and rotary pads and/or rotary journals, which supports the loads. As will be described herein after, the bearing fluid is caused to circulate in a closed loop, including a heat exchanger where heat removed by the bearing fluid from the bearings is dissipated, e.g. by heat exchange against sea water. If mechanical seals are provided, such as mechanical seals 29 and/or 31, bearing fluid can also be used to flush the mechanical seals.

As mentioned above, the bearing fluid can be a liquid, e.g. lubricating oil or a water-glycol mixture.

In some embodiments, the non-drive end bearing 27 is a simple radial bearing, i.e. a bearing capable of providing a radial support to the pump shaft 11. The structure and operation of the radial bearing 27 are known to those skilled in the art and will not be described in detail herein.

In contrast to prior devices, the combined bearing 25 arranged (in the illustrated embodiment) at the drive end side 11A of the pump shaft 11 can provide a combined radial bearing capability as well as a thrust bearing capability, i.e. axial bearing capability. In other words, the combined bearing 25 can be configured to support the pump shaft 11 both radially as well as axially. Moreover, in embodiments disclosed herein the combined bearing 25 further combines a bearing fluid boosting function, i.e. it provides the function of feeding the bearing fluid to the bearings and to the mechanical seals of the pump shaft 11, if provided.

Manufacturing and installing a combined bearing 25 instead of separate radial bearing, axial bearing and bearing-fluid boosting pump reduces manufacturing and assembling costs. The combined bearing also provides improved reliability and longer MTBF (mean time between failures), thus improving the overall availability of the multistage centrifugal pump, or other turbomachine, wherein the combined bearing is used. Refurbishing and repairing of turbomachines are made easier and faster.

The circuitry for the bearing fluid throughout the turbomachine can also be made simpler and less expensive.

Figure 3:
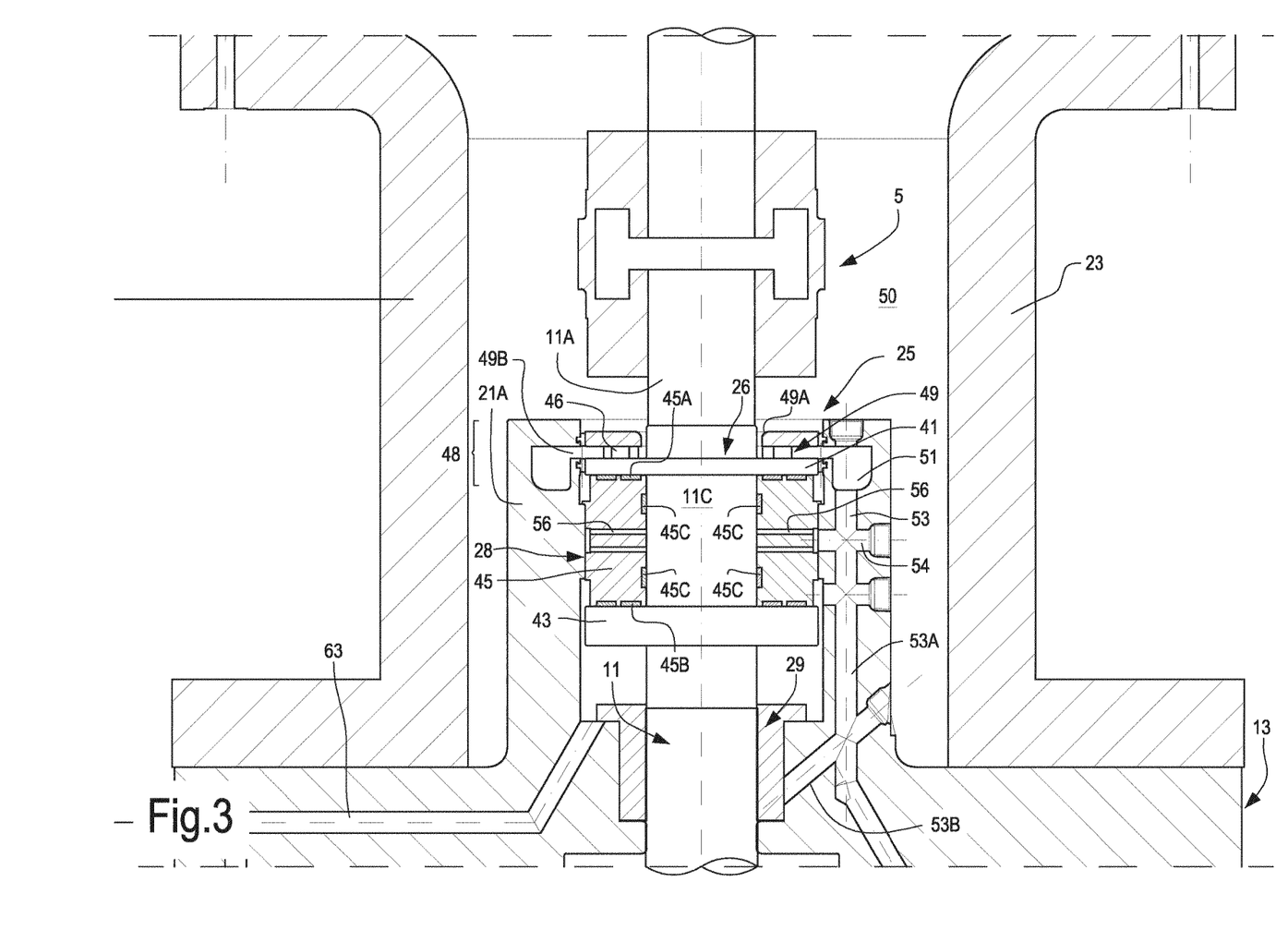
FIGS. 3 and 4 illustrate enlargements of the drive end bearing arrangement and non-drive end bearing of the multistage centrifugal pump of FIGS. 1 and 2.

In exemplary embodiments, as illustrated in FIG. 3 with continuing reference to FIG. 2, the combined bearing 25 can be arranged in a seat 21A that can be integrally formed with, or mechanically connected to the cover 21 or other parts of the pump casing 13. The seat 21A can be housed in a volume 50 surrounded by the intermediate casing element 23.

The combined bearing 25 comprises a thrust bearing member, or axial bearing member 26, and a radial bearing member 28. According to some embodiments, the thrust bearing member 26 is comprised of a first rotary thrust bearing ring 41 and a second rotary thrust bearing ring 43. The first bearing rings 41 and second thrust bearing ring 43 can be integrally formed with the pump shaft 11. More particularly the first bearing ring 41 and the second bearing ring 43 are manufactured as separate components and mounted and constrained to the pump shaft 11.

The first thrust bearing ring 41 and second thrust bearing ring 43 can be axially distanced from one another such as to house a stationary, annular pads-carrying member 45 there between. The stationary, annular pads-carrying member 45 can be provided with opposed stationary thrust bearing pads to support axial loads oriented in opposed axial directions. More specifically, the annular pads-carrying member 45 can be provided with first stationary, i.e. non-rotating thrust bearing pads 45A, co-acting with the first rotary thrust bearing ring 41, and with second stationary thrust pads 45B, co-acting with the second rotary thrust bearing ring 43. The first rotary thrust bearing ring 41 and second rotary thrust bearing ring 43 (collectively, first and second rotary thrust bearing rings 41 and 43) and the respective stationary thrust bearing pads 45A, 45B form the thrust bearing member 26, which supports axial loads, i.e. axial thrusts, generated on the pump shaft 11 in both directions, i.e. upwardly and downwardly directed axial thrusts. Each first and second rotary thrust bearing ring 41, 43 are provided with active surfaces facing the first thrust bearing pads 45A and second stationary thrust bearing pads 45B, respectively. The active surfaces can be provided with respective rotary thrust bearing pads, not shown, facing the corresponding stationary thrust bearing pads 45A, 45B. Gaps are formed between each set of non-rotating, i.e. stationary, thrust bearing pads 45A, 45B and the respective active surfaces of first and second rotary thrust bearing rings 41, 43. Pressurized bearing fluid is delivered in the gaps as will be described later on.

The pump shaft 11 extends axially through the stationary, annular pads-carrying member 45, forming a journal 11C between the first rotary thrust bearing ring 41 and the second rotary thrust bearing ring 43. The journal 11C can co-act with radial pads 45C supported by the stationary, annular pads-carrying member 45 and arranged at a substantially cylindrical inner surface of the pads-carrying member 45. The journal 11C and the radial pads 45C form the radial bearing member 28, which provides a radial supporting function upon pump shaft 11. Gaps are formed between the radial pads 45C and the cylindrical outer surface of the journal 11C. Pressurized bearing fluid is delivered through these gaps as will be described in greater detail herein after.

According to some embodiments, the stationary thrust bearing pads 45A, 45B and/or the radial pads 45C can be poly crystalline diamond pads, ceramic pads, or made of other materials capable of resisting to high temperature and high load conditions, as well as suitable for operating with fluids containing abrasive particles, such as sand-containing sea water.

In the exemplary embodiment illustrated in the drawings, the stationary thrust bearing pads 45A, 45B and the radial pads 45C are rigidly mounted on the annular pads-carrying member 45. In other embodiments, one, two or all the sets of pads 45A, 45B, 45C can be tiltably mounted on the annular pads-carrying member 45.

As shown in FIG. 3, the combined bearing 25 can further comprise a bearing-fluid impeller 49, forming part of a bearing-fluid boosting pump 48, which rotates integrally with the pump shaft 11. In the exemplary embodiment illustrated in the figures, the bearing-fluid impeller 49 is a centrifugal impeller comprised of impeller blades 46 and a shroud 52 (see in particular FIG. 7).

Figure 7:
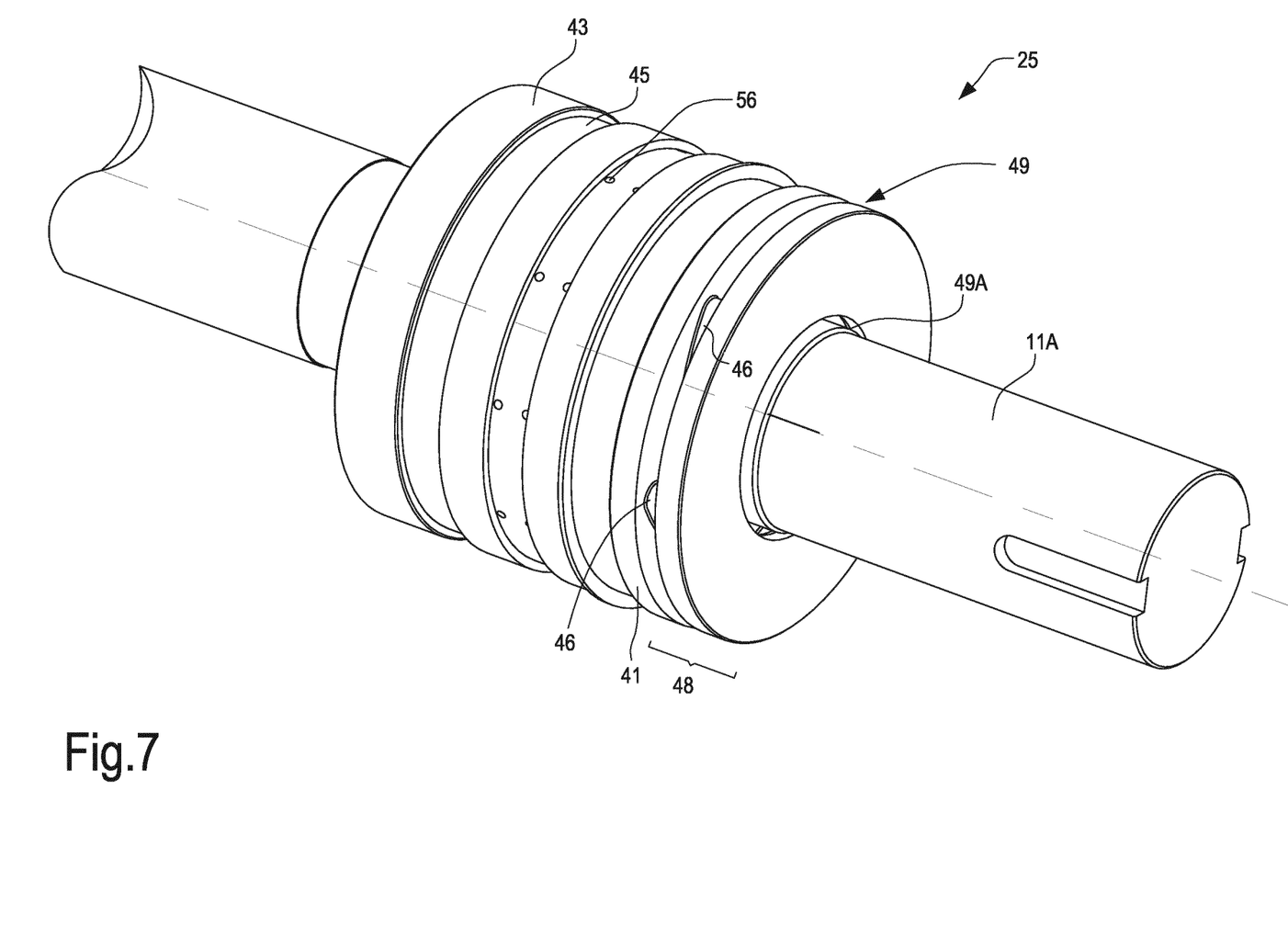
FIG. 7 illustrates an isometric view of the combined bearing.

In some embodiments the impeller blades 46 are integrally formed on the first thrust bearing ring 41. More specifically, in this exemplary embodiment the impeller blades 46 are provided on the surface of the first thrust bearing ring 41 facing away from the first stationary thrust bearing pads 45A and opposite the second thrust bearing ring 41. The bearing-fluid impeller 49 has an impeller inlet 49A and an impeller outlet 49B. The impeller inlet 49A can be in fluid communication with the inner volume 50 of the intermediate casing element 23. The inner volume 50 of the intermediate casing element 23 can form a bearing-fluid reservoir. The impeller outlet 49B can be in fluid communication with a volute 51 of the bearing-fluid boosting pump 48. The volute 51 can be formed in the seat 21A and can circumferentially surround the bearing fluid impeller 49.

Fluid contained in volume 50 is pumped by the bearing fluid impeller 49 of the bearing-fluid boosting pump 48 into the volute 51, wherefrom the bearing fluid flows towards the combined bearing 25 and the mechanical seal 29, to provide radial and axial support for the pump shaft 11 and flush the mechanical seal 29. For this purpose, the volute 51 can be fluidly coupled to the gaps provided between active surfaces of the first and second rotary thrust bearing rings 41, 43 and first stationary thrust bearing pads 45A and second stationary thrust bearing pads 45B, respectively, as well as to gaps between the radial active surface of journal 11C and radial pads 45C. The volute 51 is further fluidly coupled to the mechanical seal 29.

In some embodiments, a longitudinally extending fluid delivery duct 53 and a radially extending fluid delivery duct 54 are provided in the seat 21A. The radially extending fluid delivery duct 54 can be in fluid communication with radial ports 56 provided in the stationary, annular pads-carrying member 45, for delivering pressurized bearing fluid to the radial bearing member 28 and to the thrust bearing member 26.

Figure 4:
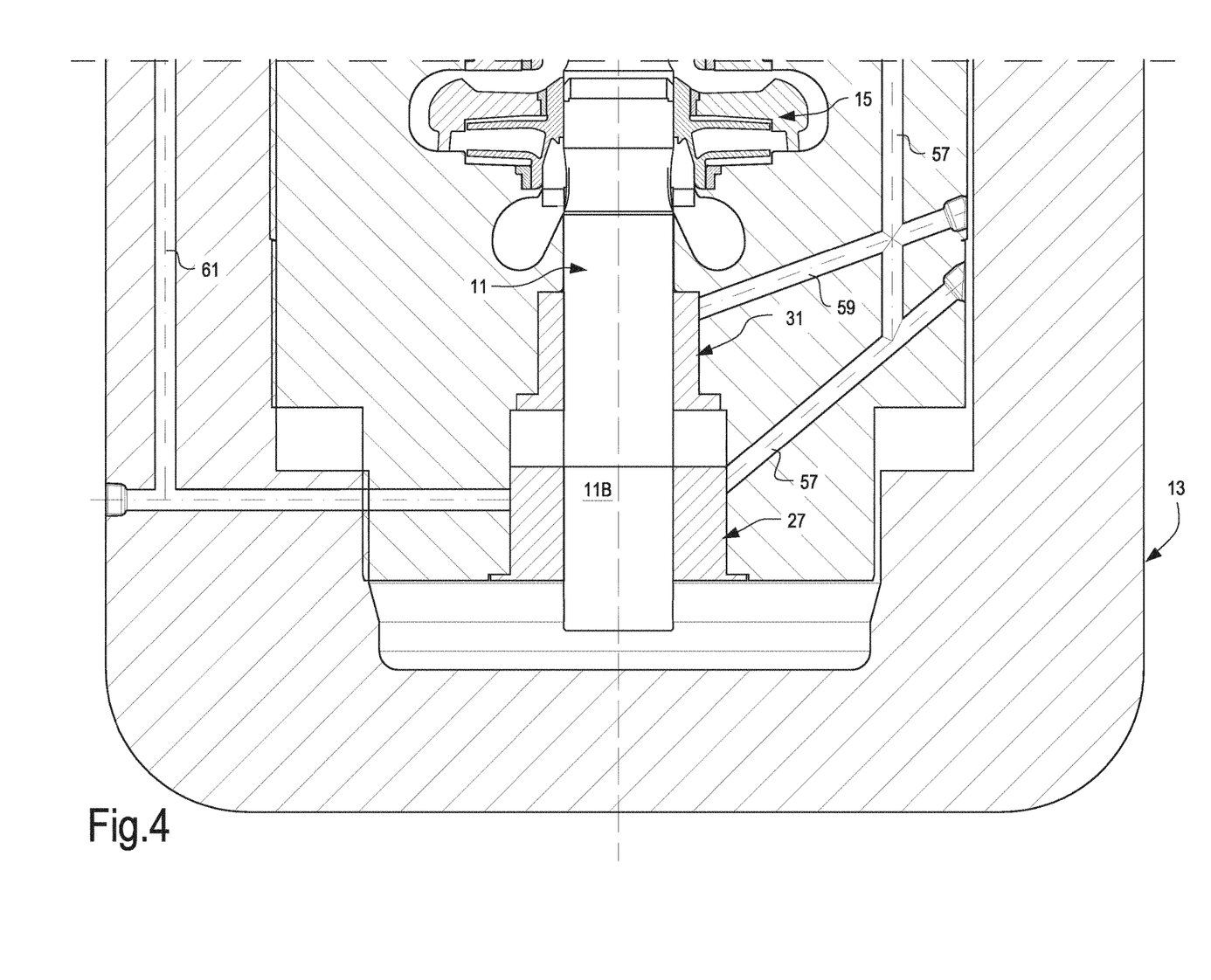

Referring to FIGS. 2 to 4, operation of the pump 1 will now be described. In operation, the electric motor 3 drives into rotation the pump shaft 11 and the pump impellers 15 mounted thereon. Rotation of the pump shaft 11 causes also the bearing-fluid impeller 49 to rotate, such that pressurized bearing fluid is pumped by the bearing-fluid impeller 49 through ducts 53, 54 and through radial ports 56, thus flushing the gaps between radial pads 45C and journal 11C of pump shaft 11, generating therein a bearing fluid film. The bearing fluid further flows from the gaps between journal 11C and radial pads 45C into the axial gaps between stationary thrust bearing pads 45A, 45B and the respective active surfaces of the first and second thrust bearing rings 41, 43 and is finally collected at the bottom of seat 21A.

The duct 53 can further extend longitudinally in 53A, 53B to establish a fluid connection between the volute 51 and the mechanical seal 29.

Bearing fluid flushing the mechanical seal 29 and the combined bearing 25 is collected at the bottom of the seat 21A, wherefrom the bearing fluid exits the pump casing as described herein after. Bearing fluid which leaks through the mechanical seal 29 towards the interior of the multistage centrifugal pump 1 can be discharged in the main flow of the working fluid processed by the multistage centrifugal pump 1.

The volute 51 can be further fluidly coupled to the non-drive end radial bearing 27 and to the non-drive end mechanical seal 31, to feed pressurized bearing fluid thereto. A further duct 55, 57, which can extend along the cover 21 and the barrel 17 of the multistage centrifugal pump 1, can extend from duct 53A down to the non-drive end radial bearing 27, as best shown in FIG. 4. A side duct 59 can further fluidly connect the duct 57 with the non-drive end mechanical seal 31. This circuit provides pressurized bearing fluid to the non-drive end radial bearing 27 for lubrication and cooling purposes, and further for flushing the non-drive end mechanical seal 31. Leakages of bearing fluid from the non-drive end mechanical seal 31 towards the pump impellers 15 merges with the main working fluid processed by the multi-stage centrifugal pump 1.

The bearing fluid outflowing from the non-drive end radial bearing 27 and from the mechanical seal 31, on the side of the non-drive end radial bearing 27, can be collected via an outlet duct 61, which can be provided in the barrel 17. A further outlet duct 63 can be provided for collecting the bearing fluid outflowing from the drive end mechanical seal 29 and the combined bearing 25 and collected in the bottom of seat 21A.

The outlet ducts 61, 63 can be in fluid communication with an external heat exchanger, schematically shown at 65 in FIG. 2, wherefrom a return duct 67 delivers the cooled bearing fluid back in the inner volume 50. In the heat exchanger 65 the bearing fluid can be cooled by heat exchange, for instance against sea water, if the multistage centrifugal pump 1 is configured as a multistage centrifugal subsea pump.

Figure 5:
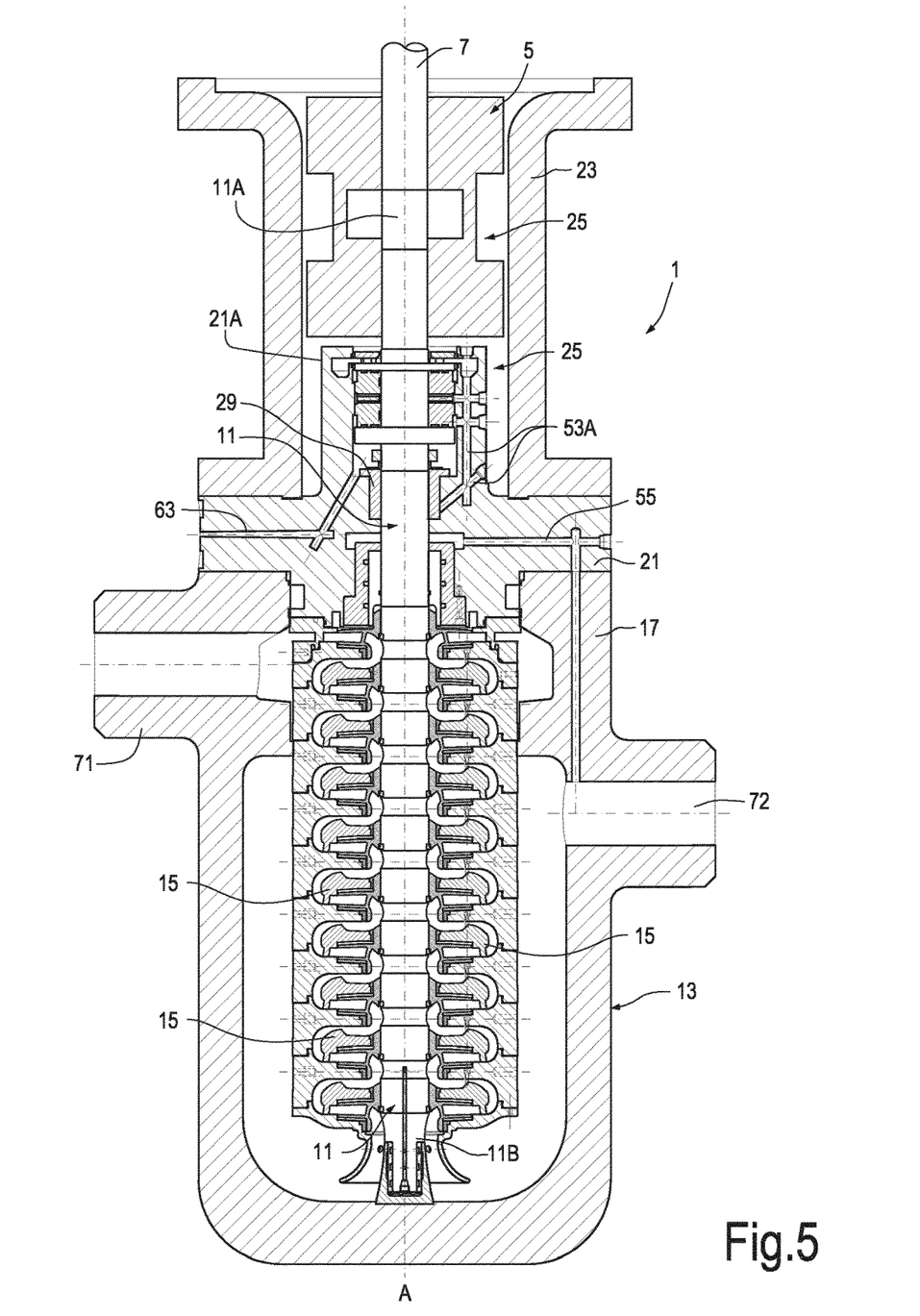
FIG. 5 illustrates a sectional view, along a plane containing the rotation axis, of a second embodiment of a multistage centrifugal pump according to the disclosure.
Figure 6:
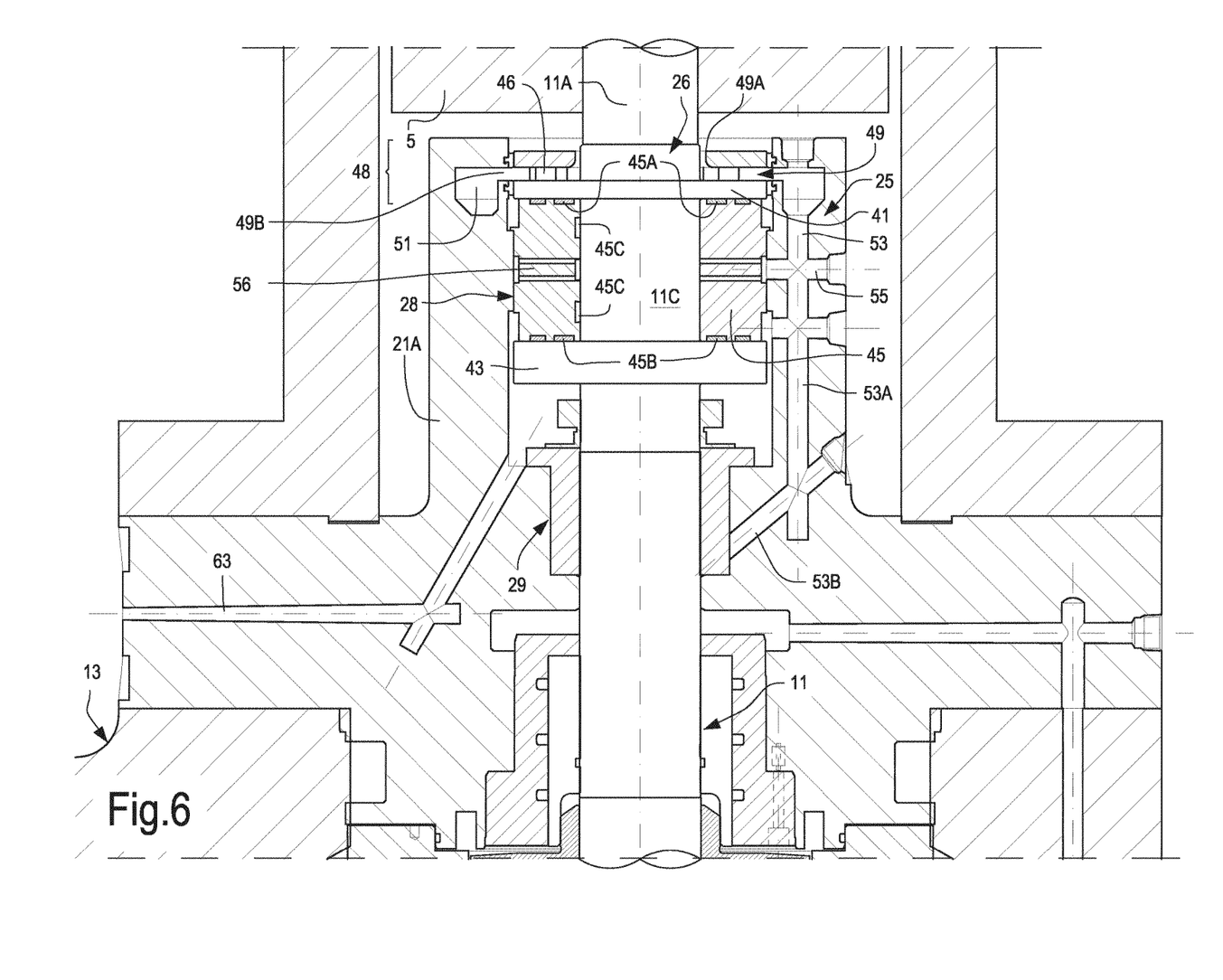
FIG. 6 illustrates an enlargement of the drive-end bearing arrangement of FIG. 5.

FIGS. 5 and 6 illustrate a further embodiment of a multistage centrifugal pump 1 according to the present disclosure. The same reference numbers designate the same or corresponding parts and components as already described in connection with FIGS. 2, 3, 4. These parts will not be described again.

In FIG. 5, reference numbers 71 and 72 indicate a pump inlet and pump outlet manifolds, respectively.

The drive-end side of the pump shaft 11 is radially and axially supported by a combined bearing 25, which provides radial and axial bearing capabilities and which further integrates a bearing-fluid boosting pump 48 comprised of a bearing fluid impeller 49 for delivering pressurized bearing fluid in a volute 51. The bearing fluid boosted by bearing fluid impeller 49 is supplied to the axial and radial bearing pads of combined bearing 25 and to a drive-end mechanical seal 29. The combined bearing 25 of FIGS. 5, 6 can be substantially the same as the combined bearing 25 of FIGS. 2, 3.

The non-drive end mechanical seal is omitted and the non-drive end bearing is immersed in the working fluid processed by the multistage centrifugal pump 1. No fluid connection with the volute 51 is provided.

In the above described embodiments the combined bearing 25 is arranged at the drive end 11A of pump shaft 11 and a simple radial bearing 27 is located at the non-drive end 11B of pump shaft 11. However, in other embodiments a reversed arrangement can be provided, wherein the combined bearing 25 is arranged at the non-drive end 11B of pump shaft 11, while a simple bearing, e.g. a simple radial bearing can be located at the drive end 11A of pump shaft 11.

The thrust bearing pads 45A, 45B and the radial pads 45C can be configured as known fluid bearing pads and can be rigidly coupled to the stationary, annular pads-carrying member 45. In other embodiments, the thrust bearing pads 45A, 45B and/or the radial pads 45C can be tiltably mounted on the stationary, annular pads-carrying member 45.

The stationary, annular pads-carrying member 45 can be comprised of two or more portions, separated from one another by radial planes, for easy mounting around the pump shaft 11 and more specifically around the portion thereof forming the journal 11C.

In the above description, reference was made to a multistage centrifugal subsea pump 1 having a vertical rotation axis A-A and connected to an electric motor 3. It shall however be understood that the combined bearing 25 disclosed herein can be used also in other kinds of turbomachines, to support the respective shaft of the turbomachine. For instance, the combined bearing can be used in a single-stage centrifugal pump, or in other rotating axial or radial turbomachines, such as radial pumps, axial pumps, axial or radial compressors. In general, a combined bearing as disclosed herein can be utilized in rotating turbomachines where a rotating shaft requires axial and radial support by means of fluid bearings that require a continuous flow of bearing fluid from a bearing fluid pump.

Figure 8:
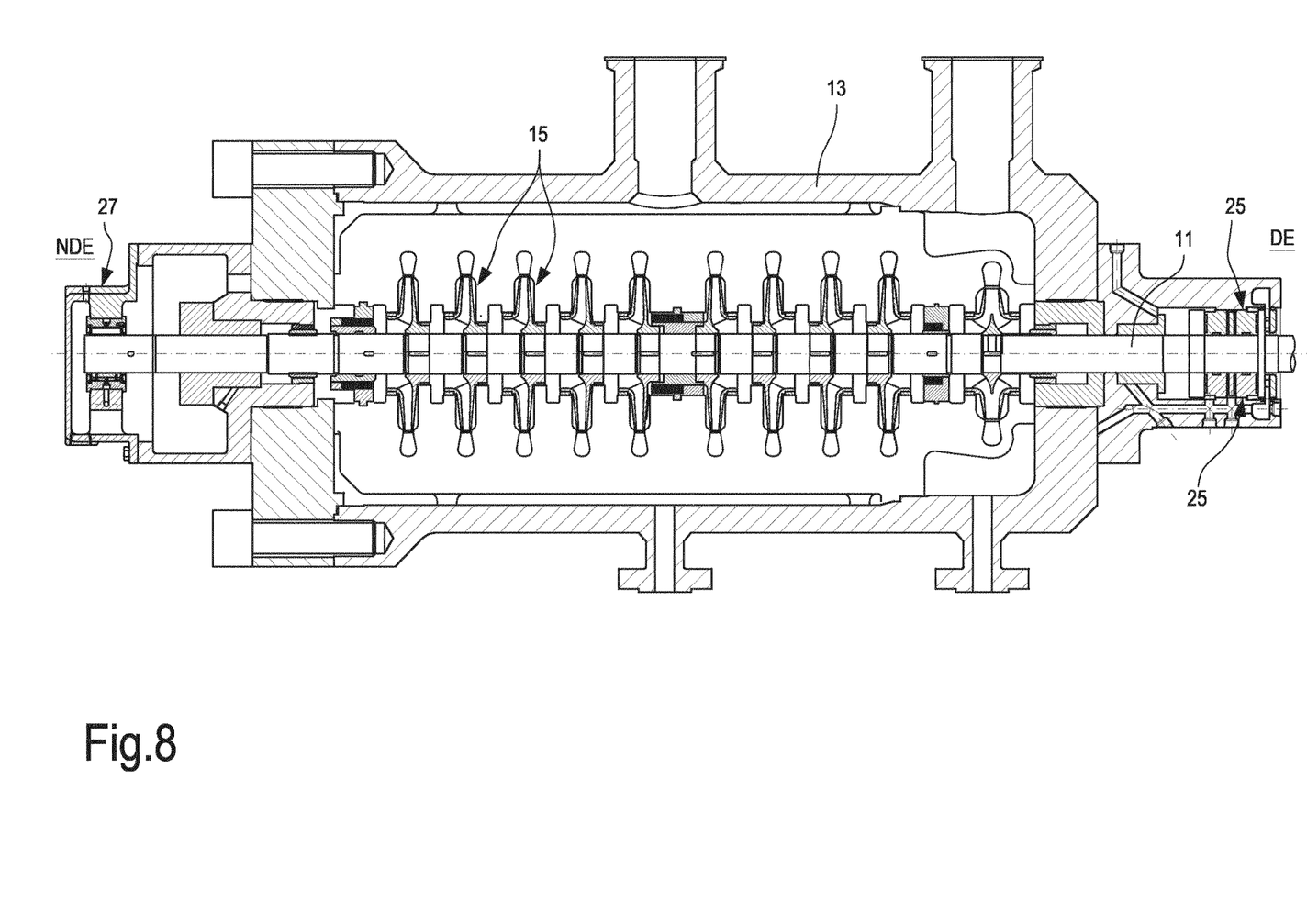
FIGS. 8, 9, 10 and 11 illustrate sectional views of further exemplary embodiments of turbomachines including a combined bearing as disclosed herein.
Figure 9:
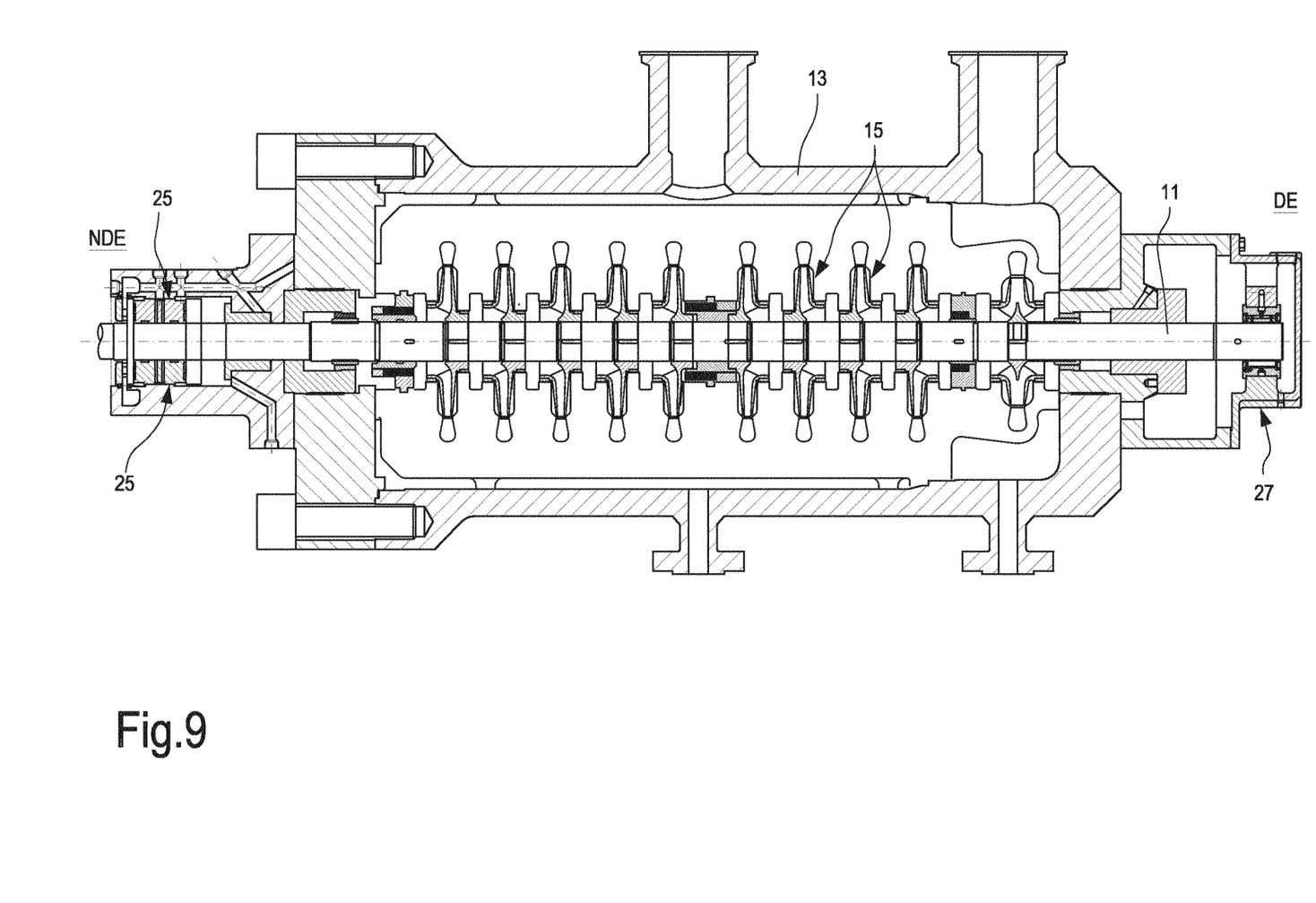

FIGS. 8 and 9 illustrate, by way of example, two embodiments of multi-stage centrifugal pumps with a back-to-back impeller arrangement. Reference number 11 indicates the pump shaft whereon pump impellers 15 are mounted. The rotor formed by impellers 15 and pump shaft 11 is supported for rotation in a casing 13. The turbomachine has a drive end DE, connected to an electric motor or other driver, not shown, and an opposite non-drive end NDE. The pump shaft 11 is supported by a combined bearing 25 and a radial bearing 27. Details of the radial bearing 27 and combined bearing 25 can be similar to those described herein above in connection with FIGS. 1 to 7 and will not be described again.

In the embodiment of FIG. 8 the radial bearing 27 is arranged at the non-drive end NDE, while the combined bearing 25 is arranged at the drive end DE of pump shaft 11.

In the embodiment of FIG. 9, the radial bearing 27 is arranged at the drive end DE and the combined bearing 25 is arranged at the non-drive end NDE of pump shaft 11.

Figure 10:
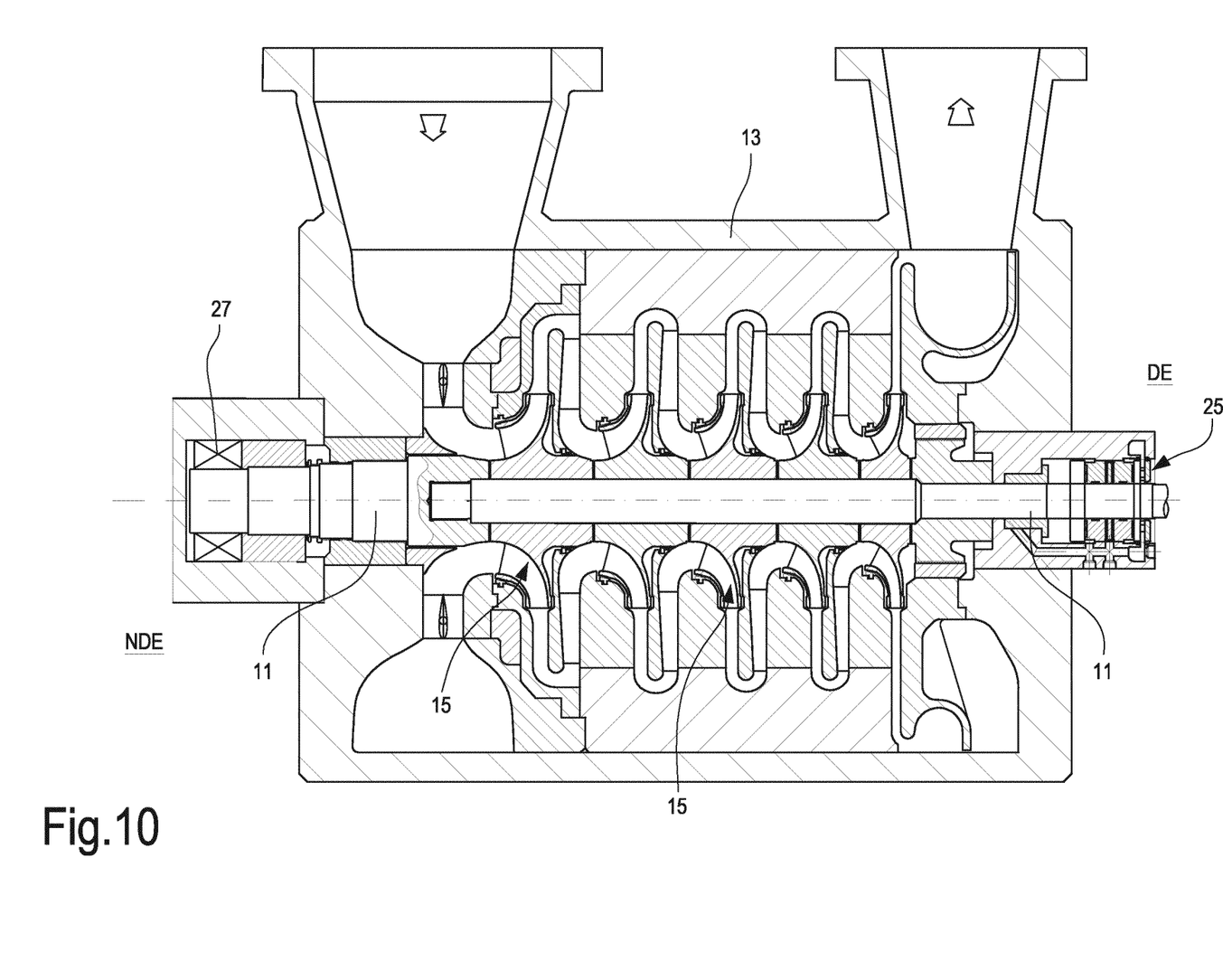
Figure 11:
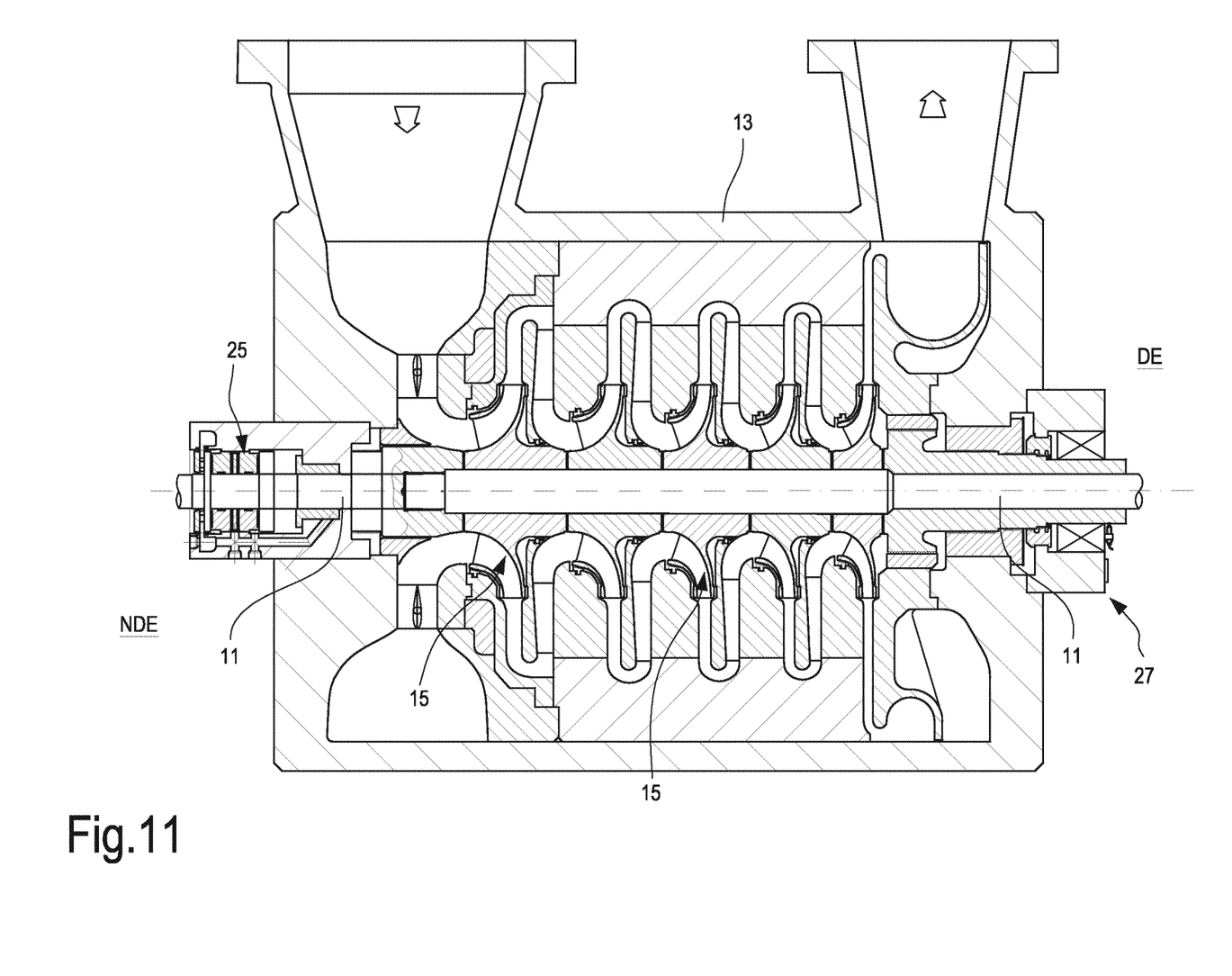

FIGS. 10 and 11 illustrate sectional views of two embodiments of a centrifugal compressor. A compressor shaft 11 and respective impellers 15 are supported for rotation in a casing 13. The compressor shaft 11 is supported by a combined bearing 25 and by a radial bearing 27. In FIG. 10 the combined bearing 25 is located at the drive end DE of the compressor shaft 11, and the radial bearing 27 is located at the non-drive end NDE of the compressor shaft 11. In FIG. 11 the reverse arrangement is shown, wherein the combined bearing 25 is located at the non-drive end NDE and the radial bearing 27 is located at the drive end DE of the compressor shaft 11. Also in these embodiments, details of the combined bearing 25 can be the same as already disclosed in connection with FIGS. 1 to 7 and will not be described again.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification and in the appended claims, specify the presence of the stated features, integers, steps, operations, elements and/or components, but do not preclude the presence or addition of one or more other features, integers, steps, operations, elements, components and/or groups thereof.

While the invention has been described in connection with what is presently considered to be the most practical and preferred examples, it is to be understood that the invention is not to be limited to the disclosed examples, but on the contrary, is intended to cover various modifications and equivalent arrangements included within the spirit and scope of the appended claims.

Finally are described hereinafter some embodiments:

The turbomachine further comprises a first mechanical seal 29, arranged between the combined bearing 25 and said at least one turbomachine impeller 15, and wherein the first mechanical seal 29 is in fluid communication with the bearing-fluid boosting pump 48, which is configured and arranged to supply bearing fluid to the first mechanical seal 29. The turbomachine further comprises a second mechanical seal 31 arranged between the turbomachine impeller 15 and the radial bearing 27, and wherein the second mechanical seal 31 is in fluid communication with the bearing-fluid boosting pump 48, which is configured and arranged to supply bearing fluid to the second mechanical seal 31. The turbomachine further comprises a cooling circuit 65, 67 having a heat exchanger 65 and in fluid communication with the bearing-fluid boosting pump 48 and the combined bearing 25, the cooling circuit being configured and arranged for receiving heated bearing fluid from the combined bearing 25 and delivering cooled bearing fluid towards the bearing-fluid boosting pump 48.

The turbomachine comprises a seat 21A, which houses the combined bearing 25, wherein a volute 51 surrounding the bearing-fluid impeller 49 is formed in said seat 21A, and wherein the volute 51 is in communication with the thrust bearing member 26 and the radial bearing member 28.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A combined bearing for a shaft of a turbomachine, the combined bearing comprising:
   at least one radial bearing portion to radially support the shaft
   at least one thrust bearing portion to axially support the shaft; and
   at least one impeller portion configured to move bearing-fluid in communication with the at least one thrust bearing portion and the at least one radial bearing portion, the at least one impeller portion being rotatable about the shaft.

2. The combined bearing of claim 1, wherein the at least one thrust bearing portion comprises a first rotary thrust bearing ring and a second rotary thrust bearing ring.

3. The combined bearing of claim 2, wherein the first rotary thrust bearing ring and the second rotary thrust bearing ring are axially spaced apart from one another and co-acting with opposed stationary thrust pads to support axial loads oriented in opposed axial directions, and wherein the at least one radial bearing portion is arranged between the first rotary thrust bearing ring and the second rotary thrust bearing ring.

4. The combined bearing of claim 3, wherein a stationary annular pads-carrying member is arranged between the first rotary thrust bearing ring and the second rotary thrust bearing ring.

5. The combined bearing of claim 4, wherein the stationary annular pads-carrying member supports first thrust bearing pads co-acting with the first rotary thrust bearing ring and second thrust bearing pads co-acting with the second rotary thrust bearing ring, the first thrust bearing pads and the second thrust bearing pads being arranged at axially opposed ends of the stationary annular pads-carrying member.

6. The combined bearing of claim 5, wherein radial pads are arranged at a substantially cylindrical inner surface of the stationary annular pads-carrying member and co-act with a journal arranged within said substantially cylindrical inner surface.

7. The combined bearing of claim 2, wherein the at least one impeller portion is integral with one of said first rotary thrust bearing ring and said second rotary thrust bearing ring.

8. The combined bearing of claim 7, wherein the at least one impeller portion is arranged on a face of said one rotary thrust bearing ring facing opposite the other rotary thrust bearing ring.

9. The combined bearing of claim 1, wherein an outlet of the at least one impeller portion is in fluid communication with fluid delivery ducts configured and arranged for delivering bearing fluid to the radial bearing portion and the thrust bearing portion.

10. A turbomachine comprising:
    a casing;
    a shaft supported in the casing for rotation therein;
    at least one turbomachine impeller mounted on the shaft for co-rotation therewith; and
    a combined bearing according to claim 1, rotatingly supporting the shaft in the casing.

11. The turbomachine of claim 10, wherein the shaft has a drive end, for connection to a driver, and a non-drive end, opposite the drive end, and wherein the combined bearing is arranged at one of said drive end and non-drive end of the shaft, and wherein a radial bearing is arranged at the other of said drive-end and non-drive end of the shaft.

12. The turbomachine of claim 11, wherein a bearing-fluid reservoir is arranged between the combined bearing and the driver, the bearing fluid reservoir being in fluid communication with an inlet of the impeller portion.

13. The turbomachine of claim 11, wherein the impeller portion is in fluid communication with the radial bearing and is configured to supply pressurized bearing fluid to the radial bearing.

14. The turbomachine of claim 10, wherein the turbomachine is a centrifugal pump or a subsea pump, and is configured for operating with the shaft in vertical orientation.

15. A method of operating a turbomachine comprising a casing, a shaft supported for rotation in the casing and at least one turbomachine impeller mounted on the shaft for co-rotation therewith the method comprising the following steps:
- rotating the shaft against a combined bearing, the combined bearing providing axial and radial support to the shaft, wherein the combined bearing comprises at least one radial bearing portion, at least one thrust bearing portion, and at least one impeller configured to move bearing fluid in communication with the at least one thrust bearing portion and the at least one radial bearing portion; and
- delivering pressurized bearing fluid with the at least one impeller to the at least one thrust bearing portion and the at least one radial bearing portion.

16. The combined bearing of claim 1, wherein the at least one thrust bearing portion comprises at least one rotary thrust bearing ring.

* * * * *